Nov. 4, 1969   B. D. CONGER   3,476,924
INTEGRATOR RATE TEST SYSTEM FOR AN ANALOG COMPUTER
Filed June 20, 1966   2 Sheets-Sheet 1

INVENTOR.
BEN D. CONGER
BY Allan Ratner
ATTORNEY

INVENTOR.
BEN D. CONGER
BY Allan Ratner
ATTORNEY

United States Patent Office 3,476,924
Patented Nov. 4, 1969

3,476,924
INTEGRATOR RATE TEST SYSTEM FOR AN ANALOG COMPUTER
Ben D. Conger, Neptune, N.J., assignor to Electronic Associates Inc., Long Branch, N.J., a corporation of New Jersey
Filed June 20, 1966, Ser. No. 558,740
Int. Cl. G06g 7/18, 7/48; G06f 11/00
U.S. Cl. 235—183               8 Claims

ABSTRACT OF THE DISCLOSURE

A rate test system for a plurality of integrators in an analog computer is disclosed wherein the same voltage is applied to each integrator and all integrators operate for a period of time determined by equality between the output of the integrator having the highest rate of integration and a predetermined reference potential. Magnitude of the applied voltage is selectable as a function of the fastest or slowest rate of integration in the computer.

---

Figure 1A:
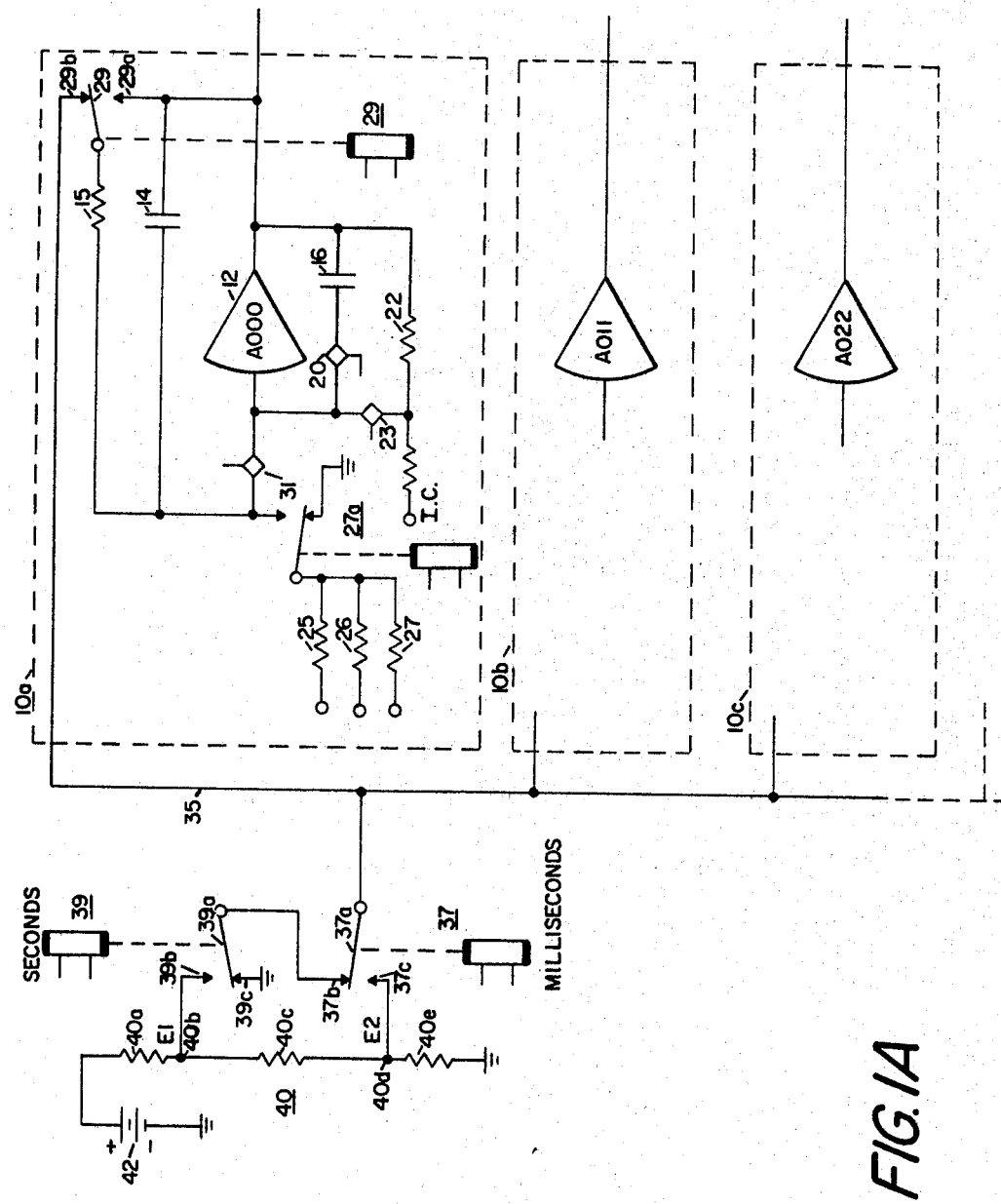

This invention relates to electronic analog computing apparatus and more particularly to dynamic testing of an analog computer.

A general purpose analog computer includes a plurality of integrators each of which performs the mathematical function of integration. Each of the integrators comprises a feedback capacitor and switching circuits which are controlled so that simultaneously all of the integrators begin to integrator an applied input voltage. The rate of integration of each integrator is a function of the capacitance value of a corresponding feedback capacitor. In order to test the integrator rate, rate test systems have been provided which perform a dynamic test of the integrators.

In some of such systems a common voltage has been applied to all integrators at a predetermined time and all of the integrators are switched to allow them to integrate that common voltage for a predetermined fixed time. The computer operator observes a read out of the output voltage of a selected integrator. When that output voltage reaches a predetermined magnitude at the end of the predetermined time, as for example one hundred volts, the operator removed the common input voltage to all integrators. At that time the computer operator reads out the integrator output of each of the other integrators and compares their output with that of the selected inegrator. This comparison of integrator output voltages tests whether the integrator rates are the same or matched.

However, such testing of integrator rates left much to be desired since many such prior systems could not test integrators with a substantially fast time constant as, for example, 0.1 millisecond. In addition, prior rate test systems did not include in the test the switching time of the integrator switching circuits. A further disadvantage of many prior rate test systems has been that they were not automatically programmable from a digital computer.

Accordingly, an object of the present invention is a rate test system for an analog computer having a substantially high integrator test rate to obtain valid readings of integrators having substantially fast time constants.

Another object of the present invention is a rate test system for testing integrator rates which includes checking the switching time of the individual switching circuits of each of the integrators.

A further object of the invention is a rate test system for an analog compuer which is automatically programmable from a digital computer.

In accordance with the present invention there is provided a rate test system for an analog computer having a plurality of integrators. Each of the integrators has an operate, an initial condition, and a hold switching circuit connected to the summing junction of the corresponding integrator amplifier. In making a rate test, the operate and hold switching circuits are switched to open circuit and the initial condition switch is closed, thereby grounding the hold capacitor to remove any signal stored thereon. One of the integrators is selected as a master integrator and its output is connected to one input of a comparator which compares the master integrator output with a reference potential. In addition, a common input potential is applied to all operate switching circuits on the side opposite to that connected to the corresponding integrator amplifier.

After all the foregoing has occurred, all of the initial condition switches are closed, all of the operate circuits are switched to closed circuit and simultaneously all integrators commence integration. The integration continues until the output of the master integrator becomes equal in value to the reference potential and the comparator produces a hold signal. At that time all operate circuits are opened and all hold circuits are closed and the output of each integrator is stored. A read out system sequentially reads out the stored values of each integrator output which may be compared with the value of the stored output of the master integrator. In this manner the rate of integration and the switching times of the operate and hold switching circuits of each integrator may be compared with that of the master integrator. In accordance with the invention, a rate test may be made of integrators having substantially fast time constants.

Figure 1B:
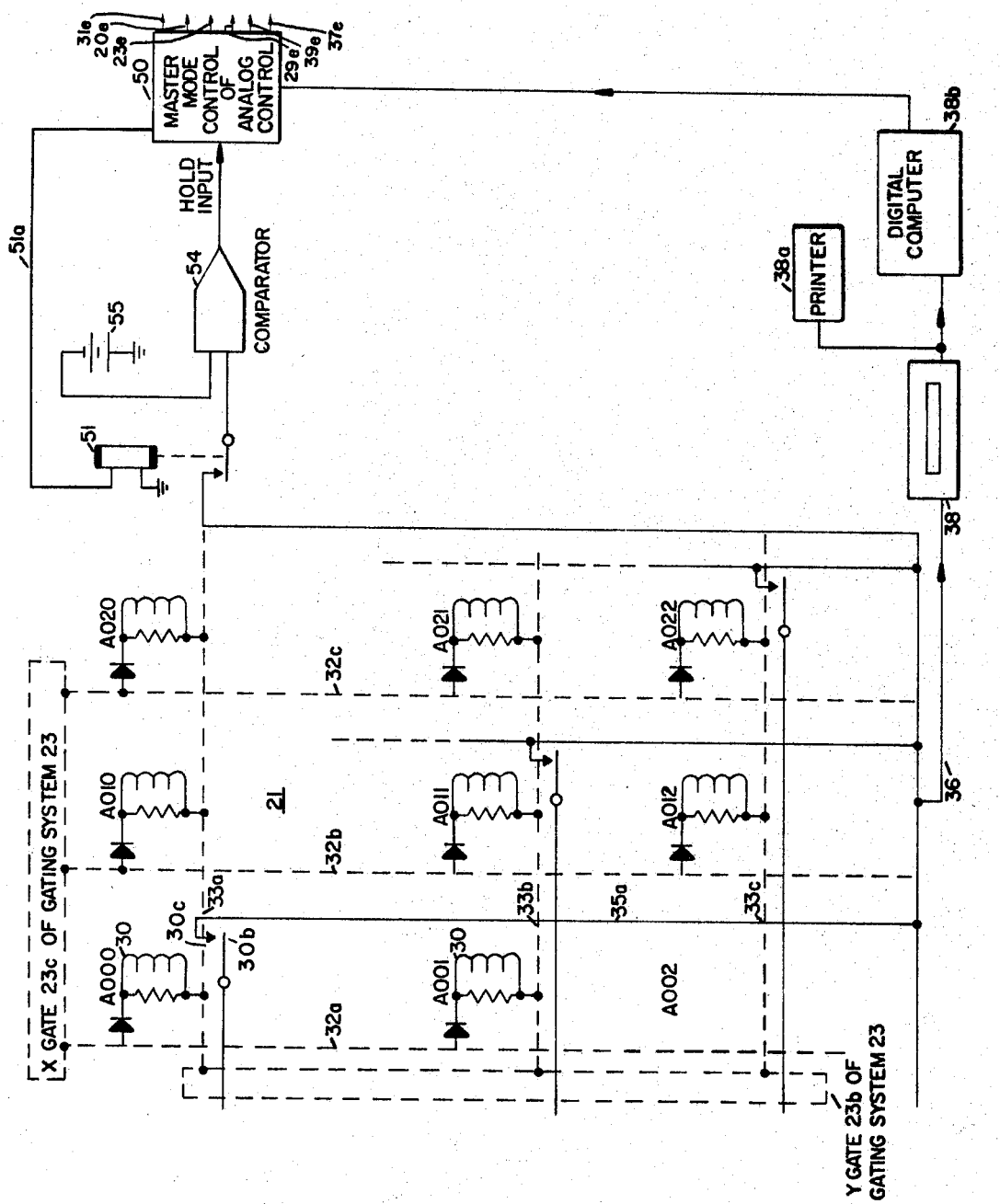

For further objects and advantages of the invention and for a more detailed discussion of its component parts and its manner of operation, reference is to be had to the following description taken in conjunction with the accompanying drawings in which FIGS. 1A and 1B are taken together to schematically illustrate a rate test system of the invention.

Referring now the FIGS. 1A and 1B, there is shown a plurality of integrators 10a–10c used in an analog computer only one of which, 10a, has been illustrated in detail. It will be understood that a general purpose analog computer may have many of such integrators as well known in the art as described, for example, in section 4, parts 1–3 of Computer Handbook, edited by Huskey and Korn, McGraw-Hill Book Co., Inc. 1962.

As described in the cited handbook, an integrator may comprise a direct coupled operational amplifier 12 having a feedback capacitor 14 and a feedback resistor 15 each adapted to be connected across the amplifier. An additional storage capacitor 16 has one end connected to the output of amplifier 12 and its other end connected by way of a hold switch 20 to the summing junction of the amplifier. In addition, the output of amplifier 12 is connected by way of a resistor 22 and an initial condition switch 23 to the summing junction of amplifier 12. Input resistors 25–27 have their first terminals connected to respective input circuits and their second terminals connected to a "summing junction input." This junction is connected to a moveable arm of an operate-hold relay 27a, which in the illustrated position engages a fixed contact which is connected to ground. The other fixed contact of relay 27a is connected to a "summing junction feedback" coupling feedback resistor 15 and feedback capacitor 14, and by way of operate switching circuit 31 to the summing junction of amplifier 12.

It will be understood that switching circuits 20, 23 and 31 are of the semi-conductor type. These switching circuits when in their open circuit position connect to ground the side of the respective switching circuit opposite the amplifier summing junction as described, for example, in the above cited handbook.

In addition, each of the integrators 10a–10c includes a potentiometer setting relay 29 having a moveable contact connected to resistor 15 and a fixed contact 29a connected to the output of amplifier 12. The other fixed contact 29b of relay 29 is connected to a conductor 35 common to the pot set relays of all integrators 10a–10c, etc. Common conductor 35 is connected to moveable contact 37a of a relay 37. Relays 37 and 39 are rate test input relays which operate in conjunction with voltage divider 40 to provide a predetermined input voltage range to all of the integrators by way of conductor 35.

Specifically, one side of divider 40 is connected to the positive side of battery 42, the negative side of which is connected to ground. Voltage divider 40 includes the connection to battery 42, a first resistor 40a, a junction 40b, a second resistor 40c, a second junction 40d and a third resistor 40e connected to ground.

It will be understood that the voltage developed at junction 40b, viz, E1, is greater in potential than the voltage developed at junction 40d, viz, E2. The higher potential E1 is applied by way of junction 40b to a fixed contact 39b of rate test input relay 39 while another fixed contact 39c is connected to ground. The moveable contact 39a of relay 39 is connected to a fixed contact 37b of relay 37 while the other fixed contact 37c is connected to junction 40d which develops the lower potential E2.

It will now be understood that with both relays 37 and 39 deenergized, as illustrated, that the input potential to integrators 10a–10c by way of common conductor 35 is ground potential. If relay 39 is actuated then the higher potential E1 is applied to conductor 35. On the other hand, if relay 37 is actuated then the lower potential E2 is applied to conductor 35. It will be understood that one and only one of the relays 37 and 39 may be actuated at any one time to apply a common input voltage to integrators 10a–10d.

Relay 39 is identified as a "seconds" relay for applying the higher voltage E1 and is used with higher valued integrating capacitors 14, as for example 10 microfarad. On the other hand, relay 37 is identified as a "millisecond" relay and applies the lower input voltage E2 which is used with lower valued integrating capacitors 14, as for example .01 microfarad. In one embodiment voltage E1 may be one thousand times higher in value than the voltage of E2. In each of the integrators 10a–10c the respective feedback capacitors 14 may be of differing values. As for example, the feedback capacitor for integrator 10b may have a capacitance value one tenth or one hundredth lower than the capacitor 14 of integrator 10a.

The output of each of the integrators 10a–10c etc. is connected to a contact of an individual relay 30 corresponding to a respective address in the analog computer of the integrator. It will be assumed integrator 10a has an address A000, 10b has an address A011, and 10c has an address A022. Relays 30 are connected in a matrix as described in detail in patent application Ser. No. 455,470 by Alfred G. Tonnessen for Readout System, filed May 13, 1965 with corresponding elements having been identified by similar reference characters. Specifically there is provided a gating system 23 having X gates 23c and Y gates 23b. More particularly, at any one time only a single X-gate is effective to produce an energizing signal on only one of the relay matrix drive lines 32a–32c. At the same time only a single Y-gate is effective to produce an energizing signal on only one of the relay matrix drive lines 33a–33c. In this manner with one of the lines 32a–32c energized and one of the lines 33a–33c energized an address is selected. If a relay 30 does exist at that selected address, then that relay is actuated. While only several of the drive lines 32a–32c and 33a–33c have been shown in the drawing together with the relays 30 existing only at the illustrated addresses, it will be understood that many more drive lines may be provided with relays 30 associated with other computing elements such as integrators located at other selected addresses.

In operation of the matrix with energizing signals applied to lines 32a and 33a, the relay 30 having an address A000 is actuated thereby to shift its movable contact 30b to engage a fixed contact 30c. In this manner the output of integrator 10a is applied by way of conductor 35a, a common bus conductor 36 to an input of a digital voltmeter 38. Accordingly, voltmeter 38 displays a voltage output of integrator 10a located address A000.

Since a computing element is located at that address, a predetermined time duration is provided for taking the readout and then signals are produced for providing energizing signals to the next address A001. If address A001 is a valid address, i.e., a relay 30 is located at that address associated with an amplifier for example, then the foregoing operation is repeated with a readout taken on meter 38. However, if a relay is not located at that address, a signal is produced indicating an invalid address and the system immediately is stepped to the next address without taking a readout. In this manner there is provided sequential addressing of the computing elements with readout being taken only at addresses having a computing element located there. Voltmeter 38 produces a digital output signal corresponding to the analog input signal applied thereto by way of the relay matrix. The digital output signal is applied to a printer 38a and a digital computer 38b.

Printer 38a prints the digital equivalent of the voltage output of the computing elements, and also prints the respective address of the elements. Thus, in accordance with the invention when the computer operator desires a readout of all of the integrators, he may have the readout system matrix scan all of the computing elements so that they are readout in turn. Since the operator knows the addresses of the integrators he will know which of the outputs are integrators and which are other elements. If the digital computer 38b is utilized with the readout system it may be operated to mask out all addresses except those of the integrators.

In the operation of the present invention to provide a rate test of the integrators, a master mode control 50 is switched by the operator by means of the keyboard or a digital computer 38b to put the analog computer into rate test initial condition mode. Thus, energizing signals are applied by way of conductor 51a to a relay 51 to close a circuit between the common bus conductor 36 and one input of a comparator 54. The other input to comparator 54 is connected to the positive side of a reference battery 55. The output of comparator 54 is connected as the hold input of master mode control 50. Master control output lines 31e, 20e, 23e, 29e, 39e and 37e are connected to their respective mode control switches 20, 23 and 31 and relays 29, 37 and 39.

With the mode control 50 in the rate test initial condition mode, the hold and operate switches 20 and 31 of each of the integrators 10a–10c are in their open circuit position while the initial condition switches 23 are in their circuit closed position and the hold and operate switches 20 and 31 respectively are open. Thus the rate test and the initial condition lights are lit on the computor control panel (not shown). A master integrator is selected having substantially the fastest time contant and only that integrator, as for example integrator 10a at address A000, has its corresponding readout relay 30 actuated to connect the output thereof to comparator 54. This his readout relay select may be made by means of a keyboard or by the digital computer 38b.

With a master integrator selected, the mode control 50 is actuated to change the computer mode to rate test operate and either of the rate test input relays 37 or 39 is actuated depending upon the value of integrating capacitor 14 of integrator 10a as previously described. It will be assumed that capacitor 14 is of value so that the "seconds" relay 39 is actuated thereby to apply the higher potential E1 to the common input conductor 35 of all of the integrators. After relay 39 is actuated, the operate switch 31 of each of the integrators 10a–10c is actuated to its closed position while the initial condition switch 23 is actuated from its closed to its open circuit position. The hold switch of each integrator is maintained in its open position. Accordingly, the integrating capacitor 14 of each of the integrators is connected across its respective amplifier 12 and integration commences in each of the integrators. Thus it will be understood that integration only begins when the operate switch 31 of each of the integrators is actuated to a circuit closed position with the integration taking place at a rate dependent on the value of an associated capacitor 14.

Since the output of integrator 10a at address A000 is connected to the comparator 54, it will be understood that when that output is equal to the potential of battery 55 then a hold input is applied to master mode control 50. At that time all of the integrators are put into the rate test hold mode. In this mode the operate switch is actuated from its closed to its open position while the initial condition switch 23 is maintained in its open postion. On the other hand the hold switch 20 is switched from its open circuit to its closed position. It will be understood that prior to this time with the hold switch 20 in its open position the left hand side of hold capacitor 16 is connected to ground and therefor the hold capacitor 16 stores the value of the potential at the output of the amplifier 12.

With the above in mind, it will now be clear that after the master integrator 10a causes the comparator 54 to apply a hold input to control 50, then all of the integrators 10a–10c of the analog computer are put into their hold mode so that each stores the value of its corresponding integration. With the integration value stored, the readout system matrix may then be utilized to compare the output voltages of each of the integrators with that of the master integrator 10a at address A000. Accordingly, in turn, each of the outputs of the integrators is readout and a printed record may be made of the output voltage and their addresses by the printer 38a. In addition, the computer operator may manually address each of the integrators and compare that integrator output with the voltage output of the master integrator 10a. Still another method of comparison is to utilize the digital computer 38b to select only the integrators by address and take the output of all of the integrators and compare each with the value of the master integrator 10a.

In accordance with the invention, the foregoing comparison of each of the integrators with the master integrator not only tests the integration rate but also tests the switching time of the hold and operate switches 20 and 31 of each of the integrators. This switching time is included in the comparison for the reason that the integrators only begin integration after their respective operate switches 31 have been actuated to the closed position and terminate integration only when their respective hold switches 20 have been actuated to the closed position and the respective operate switches actuated to the open position. Thus, the switching time as well as the rate of the integration of the individual integrating capacitors 14 is a function of the output voltage of each of the integrators. If the switching times are different for the integrators, the integrator output voltage will be different. In the comparison of integrator output voltages, the operator takes into account that the integrators may have capacitors having values one-tenth or one-hundredth of the value of the selected master integrator.

While only one embodiment of the invention has been described, it will be clear to those skilled in the art that other embodiments within the scope of the following claims may be employed.

What is claimed is:

1. In an analog computer, a dynamic testing system comprising a plurality of integrators including a master integrator each including: (1) an amplifier having a summing junction input and an output, (2) a feedback capacitor connected between said input and said output, (3) an operate switch circuit connected between said capacitor and said input, and (4) hold means including a hold switch circuit connected between the output of said amplifier and said input, control means connected to all of said operate and hold switches for controlling the state thereof, means to produce a reference potential, means for comparing the output potential of said master integrator with said reference potential for producing a hold signal, source means for producing an input potential, means connected between said source and said operate switches for applying said input potential to said operate switches, said control means closing said operating switches causing said integrators to commence integration until the occurrence of said hold signal whereby the outputs of said integrators are held, and readout means for sequentially reading out the held values of each integrator output.

2. The testing system of claim 1 in which said readout means includes matrix means having a plurality of intersections corresponding to a sequence of addresses and means connecting each of said integrators to said matrix means with each integrator connected at a respective address.

3. The testing system of claim 2 in which there is provided a gating system connected to said matrix means for applying operating signals sequentially to each of said addresses for providing a predetermined time duration for taking a readout and thereafter stepping to the next sequential address when a computing element is located at an address, and for stepping to the next sequential address when a computing element is not located at an address.

4. The testing system of claim 3 in which said source means includes a voltage divider and relay means for producing at least two input potentials of differing magnitudes.

5. A system for the dynamic testing of a plurality of integrators in an analog computer comprising, a plurality of integrators including a master integrator each of which includes an amplifier having a summing junction and an output, an integrating capacitor connected between said junction and said output, an operate switch connected between said capacitor and said junction, and hold means including a hold switch connected between said amplifier output and said junction, mode control means connected to said operate and hold switches for controlling the operation thereof, means for producing a predetermined valued reference potential, comparator means for comparing the output of said master integrator with said reference potential to produce a hold signal to said mode control means, adjustable source means for producing an input potential, means connected between said adjustable source and said operate switches for applying said input potential to said switches, said mode control means initially closing all operate switches whereby all integrators commence integration until the occurrence of said hold signal whereby the integrator outputs are stored, and readout means for sequentially reading out said stored outputs whereby the rate of integration and the switching times of the operate and hold switches of each integrator may be compared with that of said master integrator.

6. The testing system of claim 5 in which said readout means includes matrix means having a plurality of intersections corresponding to a sequence of addresses and means connecting each of said integrators to said matrix means with each integrator connected at a respective address.

7. The testing system of claim 6 in which there is provided a gating system connected to said matrix means for applying operating signals sequentially to each of said addresses for providing a predetermined time duration for taking a readout and thereafter stepping to the next sequential address when a computing element is located at an address, and for stepping to the next sequential address when a computing element is not located at an address.

8. The testing system of claim 7 in which each of said integrators includes a relay connected to said matrix means to connect the output of said integrator to a readout device upon readout of that integrator, and means connecting a digital computer between said readout device and said mode control means.

References Cited

UNITED STATES PATENTS 3,330,948  6/1967  Single _____ 235—184

OTHER REFERENCES

R. P. Sykes: Calibrating Analog-Computer Integrators from: Instruments and Control Systems, vol. 33, No. 9, pp. 1555–1559, September 1960.

MALCOLM A. MORRISON, Primary Examiner

F. D. GRUBER, Assistant Examiner

U.S. Cl. X.R.

235—153, 184; 328—127; 340—166